Nov. 7, 1967  R. HARRISON  3,351,309
RESILIENT MOUNTING

Filed Oct. 5, 1965  3 Sheets-Sheet 1

INVENTOR
REGINALD HARRISON
BY
ATTORNEY

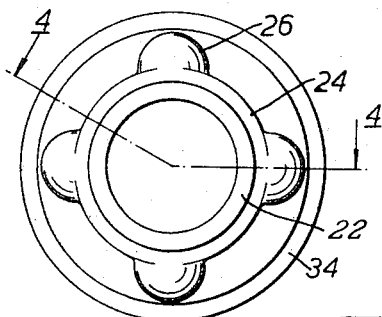
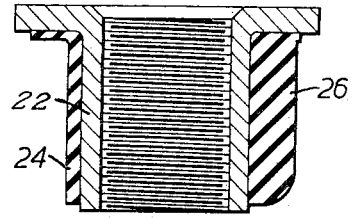
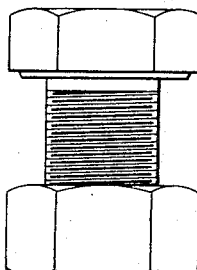
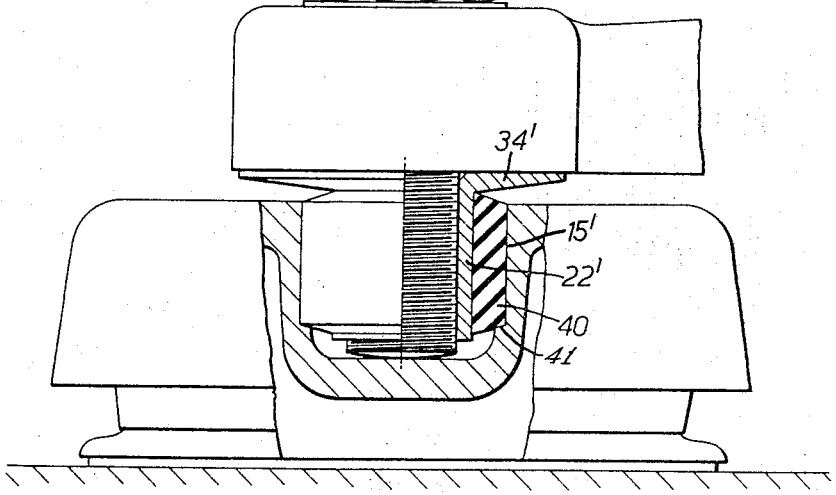
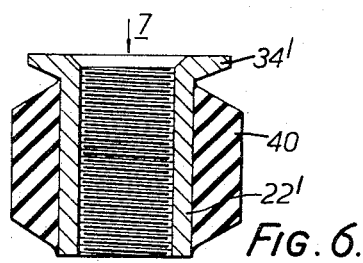
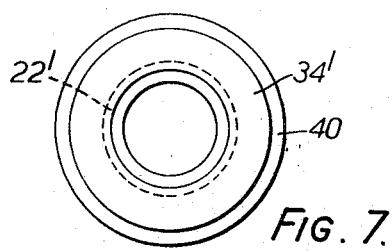

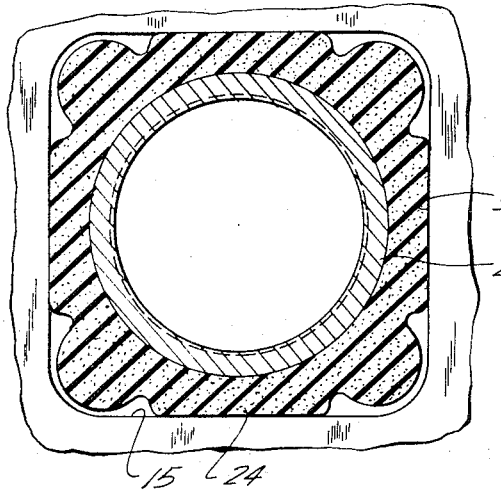
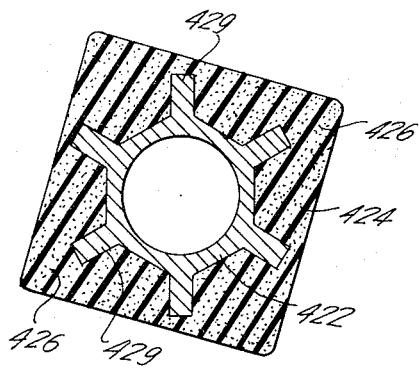
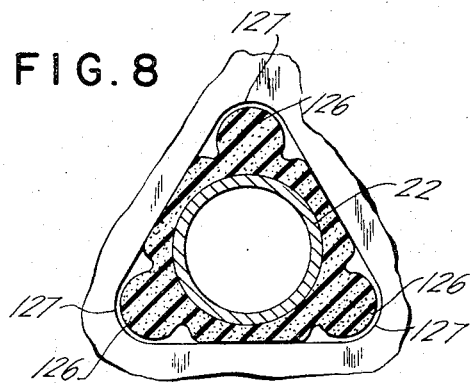
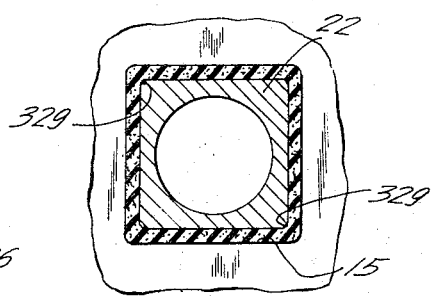
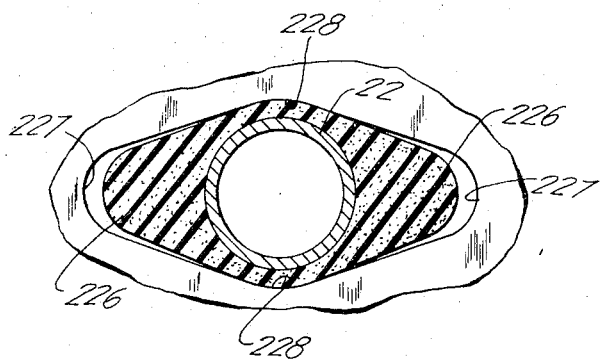

United States Patent Office 3,351,309
Patented Nov. 7, 1967

3,351,309
RESILIENT MOUNTING
Reginald Harrison, Oadby, England, assignor to Metalastik Limited, Leicester, England, a British company
Filed Oct. 5, 1965, Ser. No. 493,053
Claims priority, application Great Britain, Oct. 6, 1964, 40,656/64
13 Claims. (Cl. 248—22)

ABSTRACT OF THE DISCLOSURE

The mounting for a machine has a bottom part into which a well-shaped top part fits with clearance. Resilient, rubber inserts space the outer surface of the well from the top part. The interior configuration of the well is polygonal, for example square, and a rubber bushing with lobes sitting in the corners of the polygon retain an inner bearing piece against rotation within the well.

This invention relates to resilient mountings or supports of the kind comprising a rigid base, usually of metal, to stand upon or be secured to a floor surface or bed, a rigid upper part, usually of metal, to carry a machine or other object hereinafter termed "a machine" to be supported and one or more spring inserts for example rubber or the like material inserts interposed between the base and the upper part to maintain them in spaced relation.

Using antivibration mountings of this kind, it is often desirable to be able to level the machine on its mountings. This involves means for adjusting the height at which the machine is carried by the upper part of certain or all the mountings.

The present invention provides a resilient mounting or support of the kind described incorporating screw jack means on the upper part of the mounting for raising and lowering a machine supported on the mounting, the screw jack means comprising co-operating, threaded elements one of which is rotatable and engages said upper part to transfer thereto the load on the other element, said other element being arranged to support the machine, and a rubber or the like material bush (hereinafter termed a rubber bush) to locate said other element horizontally in relation to said upper part, the bush permitting vertical displacement thereof in relation to said upper part when the first said element is rotated.

According to a feature of the present invention, the bush may act to hold said other element against rotation relative to said upper part.

Alternatively, said other element may have a circumferential flange frictionally to engage the machine at a greater diameter than its screw threads whereby said other element is held against rotation relative to said upper part.

The arrangement may be such that the bush accommodates vertical displacement of said other element by axial shear deformation alone. Alternatively however the bush may be arranged to slip axially in addition.

Figure 1:
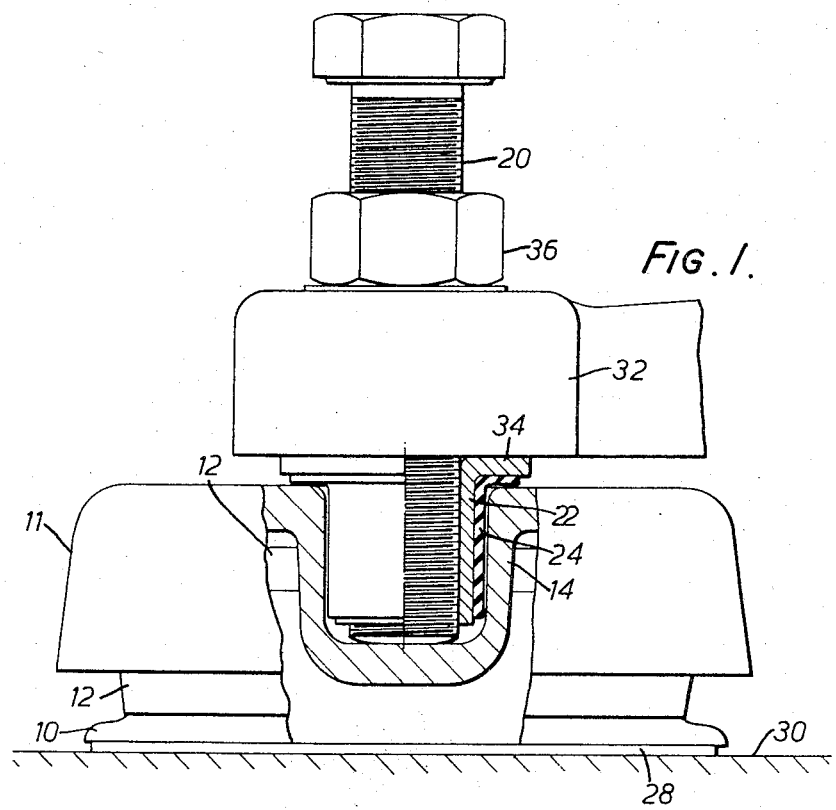
Figure 2:
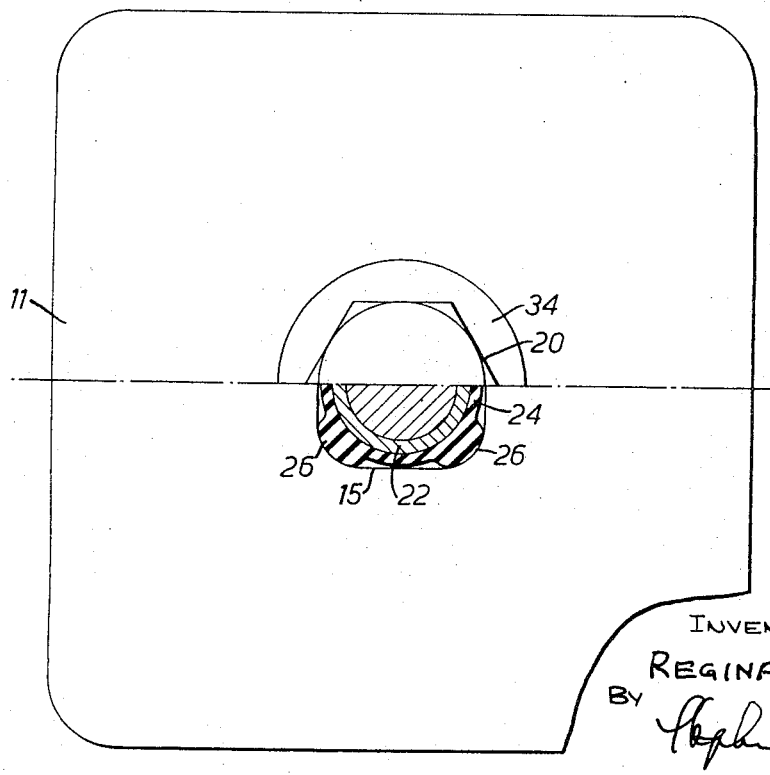

Specific embodiments of the present invention will now be described, merely by way of example, with reference to the accompanying drawings in which:

FIG. 1 is a side elevation of an antivibration mounting according to the present invention in which the upper part of the mounting is shown partially broken away to disclose cross-sectional details of the jacking means incorporated in the mounting, FIG. 2 is a plan view of the mounting with the jacking means in cross-section below the horizontal drawing axis C—C, FIG. 3 is an end view of part of the jacking means prior to its incorporation in the mounting, FIG. 4 is a cross-sectional view on line 4—4 in FIG. 3, FIG. 5 is a view corresponding with FIG. 1 and showing a modified construction, FIG. 6 is a cross-sectional view of part of the jacking means in the mounting of FIG. 5 prior to its incorporation in the mounting, FIG. 7 is a view in the direction of arrow 7 in FIG. 6, and FIGS. 8 to 12 are partial plan cross-sectional views of various embodiments of the resilient bush in its receiving well.

Referring to FIGS. 1 and 2, the mounting comprises a rigid base casting 10, a rigid upper casting 11 and a pair of rubber inserts 12 interposed between the upper and lower castings one towards each of an opposite pair of sides thereof and maintaining the castings in spaced relation.

The upper casting is formed with a central cup-like portion 14 presenting a well or hole 15 (see FIG. 2) which receives screw-jack means. The hole 15 is of square cross-section with rounded corners. The sides of the hole are vertically disposed and the floor of the hole is horizontal when the mounting is disposed on a flat horizontal surface.

The screw-jack means comprises a central screw threaded element in the form of a bolt 20 which bears at its lower end on the floor of the hole 15. The bolt 20 carries a threaded, flanged sleeve element 22 (see also FIGS. 3 and 4) which in turn carries on its outside surface and bonded thereto a rubber bush 24 having four axially extending, integrally moulded lobes 26 which are an interference fit in the rounded corners of the hole 15 as shown in FIG. 2. The base casting, in the present example, has strips 28 of high friction material, e.g. nitrile rubber, cemented to its bottom face to act as friction pads to position the mounting on the floor 30. Alternatively the base casting may have holes by means of which it can be bolted to the floor. Instead of nitrile rubber, the friction pads could be of polyurethane rubber and the friction pads may be bonded to base casting instead of being cemented thereto. The mounting is shown supporting a machine foot 32 from the floor 30. The foot 32 rests on the flange 34 of the sleeve 22. The load of the foot is transferred from the sleeve 22 to the upper casting through the bolt 20. By turning the bolt the sleeve element 22 may be raised or lowered to raise or lower the machine foot 32 to level the machine. Once levelled the foot is clamped to the flange 34 by a lock nut 36 on the bolt.

The sleeve element 22 is prevented from rotating in the hole 15 by the interference engagement of the lobes 26 in the corners of the hole. The sleeve element is able to move axially in the hole 15 during jacking movement however because the bush slips axially in the hole. The bush is preferably composed of polyurethane rubber or nitrile rubber and acts to locate the sleeve element horizontally in the hole 15.

The bolt 20 transfers the load of the foot to the upper casting well below the level of the top of the rubber inserts 12.

Instead of having a square sectioned hole 16 and four, axially extending integrally moulded lobes on the bush 24, the hole may be triangular with rounded corners, see FIG. 8 and the bush may have three such lobes 126 one to fit each corner 127. Again, the hole may be lozenge-shaped (FIG. 9) and the bush may have two oppositely disposed axially extending integrally moulded lobes 226 to fit in a pair of opposite corners 227 of the hole the other pair of opposite corners 228 of the hole being rounded and fitting directly against the outer cylindrical surface of the bush.

The sleeve element in the example just described is of plain cylindrical form. It could take some other shape however, for example, such as square (see FIG. 10), so as to provide corners 329 or edges on the sleeve element to prevent it turning round completely in the hole 15 if the thread of the jack means became completely jammed for any reason. Instead of being of a form other than cylindrical to prevent this happening, the sleeve element 422 could be provided with fins 429 (see FIG. 11) on its outer surface, for example, embedded in the lobes 426 of the bush 424.

It is not necessary for the lobes 26 to be an interference fit in the corners of the hole 15 or for the corners of the hole to be rounded to take the lobes. The interference fit holds the sleeve 22 and bush 24 in place during transport and storage but it is equally convenient for the sleeve-bush assembly to be separate and simply dropped into place by the machine erector. Referring now to FIG. 12 the lobes 26 could be a clearance fit in the corners of the hole, as seen at 521 a small clearance say 1/32" being provided to allow greater manufacturing tolerances on the rubber bush and on the hole 15. The lobes still prevent rotation of the sleeve 22 after the sleeve has been turned through a small angle the lobes then acting also to locate the sleeve element horizontally in the hole 15. This modification may be adopted whether two, three or four lobes are provided.

Again the rubber bush 24 could have a ribbed or waffled outer surface to give it more initial radial compressibility to accept dimensional tolerances on the bush and on the hole 15 whilst retaining the interference fit. Instead of doing this, the interference fit could be made to take place between the outer surface of the rubber bush between the lobes as seen at 528, FIG. 12 and the wall of the hole the lobes remaining free in the corners of the hole and not preventing rotation of the sleeve element 22 until after a small turning movement of the sleeve 22 has taken place.

In a different arrangement according to the invention, shown in FIG. 5, the hole is a stepped cylindrical hole 15' and the sleeve element 22' (see FIGS. 6 and 7) carries a plain cylindrical rubber bush 40 which is located on a step 41 at its lower end and which is held in slight radial pre-compression in the hole. The bush accommodates vertical displacement of the sleeve element 22' during jacking movements by axial shear deformation while acting always to centre the sleeve in the hole. The flange 34' of the sleeve is made somewhat larger in diameter than before and the frictional engagement between the flange and the machine foot, which is at a greater diameter than the threads of the sleeve 22', is relied upon to prevent rotation of the sleeve 22' when the bolt 20 is turned.

I claim:

1. A resilient mounting comprising a rigid base part (10) adapted to stand upon a surface, a rigid upper part (11) to carry the object to be supported, resilient insert means (12) interposed between the base part (10) and the upper part (11) to maintain said parts in spaced relation, and screw jack means associated with the upper part of the mounting for raising and lowering a machine supported on the mounting, the screw jack means comprising cooperating threaded elements (20, 22), one of which is rotatable (20) and engages said upper part to transfer thereto the load from the other element (22); said other element (22) being arranged to support the machine, and an annular body of resilient deformable material (24) secured to said other element to locate said other element horizontally in relation to said upper part, the deformable body (24) permitting vertical displacement thereof in relation to said upper part when the first said element is rotated, the annular body of resilient material (24) is separate of said resilient insert means (12) and is removably carried, along with said other element (22), in a well (15) formed in the upper part (11) of the mounting and is engaged between inwardly directed vertically disposed wall surfaces on the upper part (11) defining said well and an outwardly directed surface on said other threaded element (22).

2. A resilient mounting as claimed in claim 1 wherein the well (15) is formed with corners and the annular body of resilient material is a bush (24) fitting in the corners of the wall to hold said other element (22) against rotation relative to said upper part (11).

3. A resilient mounting as claimed in claim 2 wherein the bush is formed with lobes (26) which fit an interference fit in the corners of the well.

4. A resilient mounting as claimed in claim 3 wherein the well (15) is of square cross-section with rounded corners and the bush (24) has four of said lobes arranged in square formation.

5. A resilient mounting as claimed in claim 3 wherein the well (15) is of triangular cross-section with rounded corners and the bush (24) has three of said lobes arranged in triangular formation.

6. A resilient mounting as claimed in claim 13 wherein the well (15) is lozenge shaped and the bush (28) has two of said lobes oppositely disposed on the bush.

7. A resilient mounting as claimed in claim 2 wherein the bush is formed with lobes (26) to fit in the corners of the well when the bush is turned in the well, the lobes being a clearance fit in the corners of the well but the bush (24) having a frictional engagement fit in the well between the corners thereof.

8. A resilient mounting as claimed in claim 2 wherein said other element (22) is in the form of an internally threaded sleeve.

9. A resilient mounting as claimed in claim 2 wherein said other threaded element (22) presents edges on its said outwardly directed surface to engage in the corners of the well (15) to prevent complete rotation of the element in the well.

10. A resilient mounting as claimed in claim 9 wherein said other threaded element (22) has fins on its said outwardly directed surface presenting said edges.

11. A resilient mounting as claimed in claim 9 wherein the other threaded element (22) is a sleeve of non-cylindrical cross-section to present said edges on its outside surface.

12. A resilient mounting as claimed in claim 9 wherein the other threaded element is a sleeve formed with fins on its outer surface to present said edges on its outer surface.

13. A resilient mounting as claimed in claim 12 wherein the bush (24) is formed with lobes and at least some of the fins are embedded, in some of the lobes.

References Cited
UNITED STATES PATENTS

| | | | |
|---|---|---|---|
| 1,857,168 | 5/1932 | Steiner et al. | 248—9 |
| 2,463,059 | 3/1949 | Saurer | 248—22 |
| 2,739,774 | 3/1956 | Crede | 248—24 |

JOHN PETO, *Primary Examiner.*